United States Patent
Horikoshi (10) Patent No.: US 8,719,705 B2
(45) Date of Patent: May 6, 2014

(54) APPARATUS AND METHOD OF CONTROLLING INFORMATION PROCESSING APPARATUS, AND RECORDING MEDIUM STORING CONTROLLING PROGRAM

(75) Inventor: Hironobu Horikoshi, Toda (JP)

(73) Assignee: Ricoh Company, Ltd., Tokyo (JP)

( * ) Notice: Subject to any disclaimer, the term of this patent is extended or adjusted under 35 U.S.C. 154(b) by 1109 days.

(21) Appl. No.: 12/656,732

(22) Filed: Feb. 16, 2010

(65) Prior Publication Data

US 2010/0211873 A1 Aug. 19, 2010

(30) Foreign Application Priority Data

Feb. 16, 2009 (JP) ................................. 2009-032690

(51) Int. Cl.
G06F 3/00 (2006.01)

(52) U.S. Cl.
USPC ...... 715/705; 296/107.08; 717/136; 717/178; 707/104.1; 704/5; 704/8; 358/1.13; 358/1.11; 358/1.15; 719/313; 710/8; 709/327

(58) Field of Classification Search
None
See application file for complete search history.

(56) References Cited

U.S. PATENT DOCUMENTS

| | | | |
|---|---|---|---|
| 5,794,052 A * | 8/1998 | Harding | 717/178 |
| 6,618,771 B1 * | 9/2003 | Leja et al. | 710/8 |
| 6,938,259 B2 * | 8/2005 | McGeorge, Jr. | 719/313 |
| 7,570,374 B2 * | 8/2009 | Kawara | 358/1.11 |
| 7,788,648 B2 * | 8/2010 | Bossom et al. | 717/136 |
| 2002/0010806 A1 * | 1/2002 | Yamade | 709/327 |
| 2005/0168777 A1 * | 8/2005 | Nishikawa et al. | 358/1.15 |
| 2005/0234984 A1 * | 10/2005 | Rogerson et al. | 707/104.1 |
| 2006/0050323 A1 * | 3/2006 | Wada | 358/302 |
| 2006/0117304 A1 * | 6/2006 | Anastassopoulos et al. | 717/136 |
| 2006/0163907 A1 * | 7/2006 | Queveau et al. | 296/107.08 |
| 2006/0173671 A1 * | 8/2006 | Okawa | 704/5 |
| 2007/0002355 A1 * | 1/2007 | Kai | 358/1.13 |
| 2008/0162116 A1 * | 7/2008 | Briggs et al. | 704/8 |
| 2009/0303519 A1 | 12/2009 | Shimatani et al. | |

FOREIGN PATENT DOCUMENTS

| | | |
|---|---|---|
| JP | 2000-194519 | 7/2000 |
| JP | 2004-038650 | 2/2004 |
| JP | 2007-11794 A | 1/2007 |
| JP | 2007-272870 A | 10/2007 |
| WO | WO 2007/105577 A1 * | 3/2007 |

OTHER PUBLICATIONS

Japanese Office Action dated Jan. 15, 2013 issued in corresponding Japanese Application No. 2009-32690.

* cited by examiner

*Primary Examiner* — Boris Pesin
*Assistant Examiner* — Ayesha Huertas Torres
(74) *Attorney, Agent, or Firm* — Harness, Dickey & Pierce, P.L.C.

(57) ABSTRACT

An information processing apparatus having an operating system installed thereon is provided with a help file manager. The help file manager obtains language type information indicating a language type currently set for the operating system, obtains one of a plurality of help files that corresponds to the obtained language type information from a resource file, and expands the obtained help file into an expanded help file to store the expanded help file at the information processing apparatus. The information processing apparatus displays a help window generated based on the expanded help file that is stored.

14 Claims, 6 Drawing Sheets

| ID | LANGUAGE | DISPLAY EXAMPLE | |
|---|---|---|---|
| locale_id : 0x0411 | JAPANESE | 2008年8月21日 | ←JT |
| locale_id : 0x040c | FRENCH | jeudi21 aout 2008 | |
| locale_id : 0x0407 | GERMAN | Mittwoch, 27. August 2008 | |
| locale_id : 0x0809 | ENGLISH (UK) | 27 August 2008 | |
| locale_id : 0x0409 | ENGLISH (US) | Wednesday, August 27, 2008 | |

FIG. 8

```
[
 {
  "language" : "japanese" ,
            "locale_id"  : [
                  "0x0411"
             ]
  },
  {
            "language" : "French" ,
            "locale_id"  : [
                  "0x041c"
                  "0x080c"
                   etc...
             ]
  },
  {
            "language" : "German" ,
            "locale_id"  : [
                  "0x0407"
                  "0x0c07"
                   etc...
             ]
  },
  {
            "language" : "english" ,
            "locale_id"  : [
                  "0x0409"
                  "0x0809"
                   etc...
             ]
  }
                   etc...
]
```

APPARATUS AND METHOD OF CONTROLLING INFORMATION PROCESSING APPARATUS, AND RECORDING MEDIUM STORING CONTROLLING PROGRAM

CROSS-REFERENCE TO RELATED APPLICATIONS

This patent application is based on and claims priority under 35 U.S.C. §119 to Japanese Patent Application No. 2009-032690, filed on Feb. 16, 2009, in the Japanese Patent Office, the disclosure of which is hereby incorporated herein by reference.

FIELD OF THE INVENTION

The present invention generally relates to an apparatus and a method of controlling an information processing apparatus, and more specifically to an apparatus and a method of controlling information to be displayed through the information processing apparatus.

BACKGROUND

Figure 1:
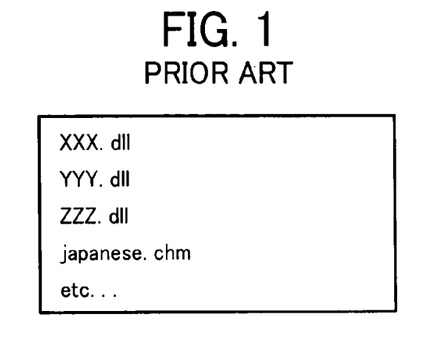
FIG. 1 is an illustration for explaining the files of a printer driver that are copied onto an information processing apparatus using a background technique.

A driver program may be installed onto an information processing apparatus to allow the information processing apparatus to control another apparatus. For example, a printer driver may be installed onto an information processing apparatus to control a printer connected to the information processing apparatus. As illustrated in FIG. 1, the printer driver includes a printer driver program, and a set of resource libraries each prepared for a specific language. At the time of installing the printer driver, a resource library for a specific language is selected and copied onto the information processing apparatus. Once the resource library for the specific language is copied, the OS is able to provide information in the specific language. Sill referring to FIG. 1, in a substantially similar manner, the printer driver is provided with a set of help files each prepared for a specific language. When the information processing apparatus receives a user instruction for displaying a help window for a specific language, a help file for the specific language is selected and copied onto the information processing apparatus. Once the help file for the specific language is copied, the OS is able to provide a help window in the specific language. In this example illustrated in FIG. 1, the help file for the Japanese language "japanese.chm" has been copied onto the information processing apparatus.

The user might however desire to change the specific language to be used by the OS after installation of the OS. If the specific language for the OS is changed to another language, the user expects the OS to provide information including the help window in another language currently set for the OS. However, since the number of a resource library or the number of a help file that could be registered for the OS is limited to one, the OS always refers to the resource library or the help file that has been selected and copied at the time of installing the printer driver. Even if the language for the OS is changed, the OS is not able to provide information such as the help window in the language currently set for the OS.

SUMMARY

In view of the above, there is a need for a technique that allows the OS of the information processing apparatus to provide information such as the help window for a driver program in the language currently set for the OS even when the language currently set for the OS has been changed from the language that has been previously set at the time of installing the driver program.

Example embodiments of the present invention include an information processing apparatus having an operating system installed thereon. The information processing apparatus includes: a storage device to store a resource file including a plurality of help files previously prepared respectively for a plurality of languages in a compressed format; a help file manager to obtain language type information indicating a language type currently set for the operating system, obtain one of the plurality of help files that corresponds to the obtained language type information from the resource file, and expand the obtained help file into an expanded help file to store the expanded help file at a specific location of the storage device; and a help display processor to generate a help window based on the expanded help file under control of the operating system. The help window is displayed through a user interface.

Example embodiments of the present invention includes a method of controlling a display of an information processing apparatus having an operating system installed thereon, the method including: storing a resource file at the information processing apparatus, the resource file including a plurality of help files previously prepared respectively for a plurality of languages in a compressed format; obtaining language type information indicating a language type currently set for the operating system; obtaining one of the plurality of help files that corresponds to the obtained language type information from the resource file; expanding the obtained help file into an expanded help file to store the expanded help file at a specific location of the information processing apparatus; and generating a help window based on the expanded help display file under control of the operating system. The method may further include displaying the help window generated based on the expanded help file through the information processing apparatus.

In addition to the above-described example embodiments, the present invention may be practiced in various other ways, for example, as a computer program causing a computer to function as the above-described information processing apparatus or causing a computer to carryout the above-described method. The computer program may be stored in a recording medium.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Figure 2:
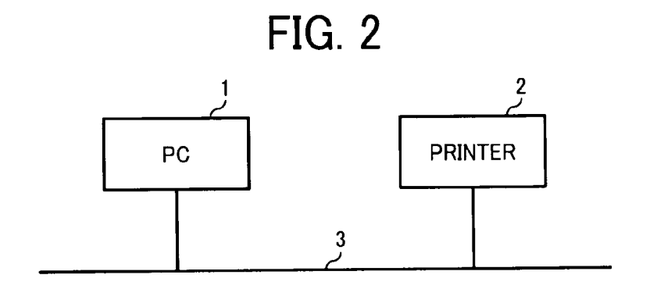
FIG. 2 is a configuration of a printing system including a personal computer and a printer, according to an example embodiment of the present invention.

Referring now to FIG. 2, a configuration of a printing system is explained according to an example embodiment of the present invention. The printing system of FIG. 2 includes a personal computer (PC) 1 and a printer 2, which are connected through a network 3 such as a local area network (LAN) and/or the Internet. Further, the network 3 may be a wired or wireless network. Through the network 3, the PC 1 instructs the printer 2 to perform operation of printing print data received from the PC 1.

Figure 3:
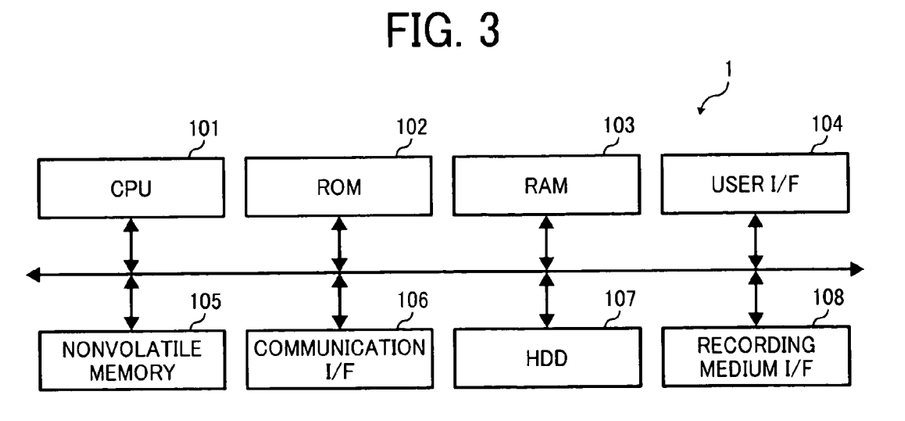
FIG. 3 is a schematic block diagram illustrating a hardware structure of the personal computer of FIG. 2.

FIG. 3 illustrates a hardware structure of the PC 1 according to an example embodiment of the present invention. The PC 1 includes a microcomputer such as a central processing unit (CPU) 101, a read only memory (ROM) 102, and a random access memory (RAM) 103. The PC 1 further includes a user interface (I/F) 104, a nonvolatile memory 105, a communication interface (I/F) 106, a hard disk drive (HDD) 107, and a recording medium interface (I/F) 108. The devices of FIG. 3 are connected with one another through a system bus.

The recording medium I/F 108 may be connected to a removable recording medium including, for example, a universal serial bus (USB) memory, secure digital (SD) card memory, flash memory, compact disc (CD), compact disc rewritable (CD-RW), digital video disc (DVD), or flexible disk. The recording medium I/F 108 writes data to or read data from the recording medium under control of the CPU 101.

The communication I/F 106 allows the CPU 101 to communicate with other apparatuses such as the printer 2 via the network 3. The nonvolatile memory 105 stores various data under control of the CPU 101 in a nonvolatile form such that the stored data is not automatically deleted after the power of the PC 1 is turned off.

The user I/F 104 allows the user to interact with the PC 1. The user I/F 104 may include an input device such as a mouse, a keyboard, etc., and an output device such as a liquid crystal display (LCD), a speaker, etc.

The RAM 103 may function as a work area of the CPU 101. The ROM 102 may store various data including, for example, various control programs to be run by the CPU 101 or system data. In this example, the ROM 102 may be rewritable.

The CPU 101 controls operation or function of the PC 1, for example, by executing a program being loaded onto the RAM 103. The program may be stored in any one of the ROM 102, the nonvolatile memory 105, the HDD 107, the recording medium connectable to the recording medium I/F 108, or any other device accessible from the CPU 101 via the network 3 through the communication I/F 106.

Figure 4:
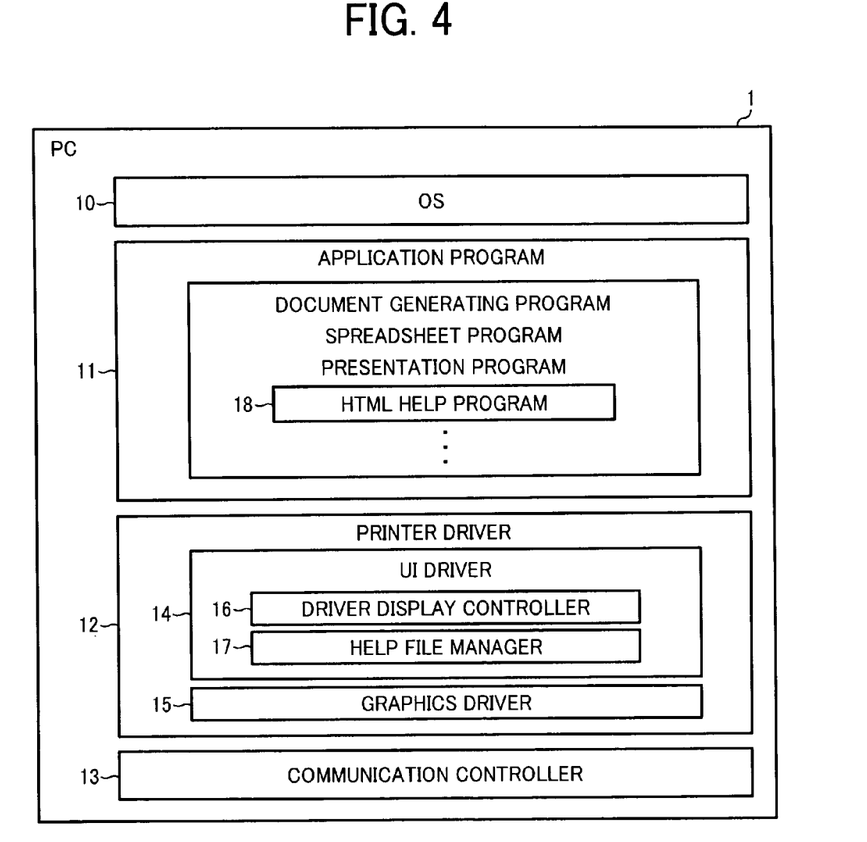
FIG. 4 is a schematic block diagram illustrating a functional structure of the personal computer of FIG. 2.

FIG. 4 illustrates a schematic functional structure of the PC 1. For example, the CPU 101 of the PC 1 loads the control program from the ROM 102 or any desired memory onto the RAM 103 to control the entire operation of the PC 1. The PC 1 of FIG. 4 includes an operating system (OS) 10, an application program 11, a printer driver 12, and a communication controller 13.

Upon execution of the OS 10, the OS 10 starts controlling the entire system of the PC 1 including operation of inputting information from the input device of the user I/F 104, outputting information to the output device of the user I/F 104, managing a memory resource such as the HDD 107, ROM 102, or RAM 103. The operation to be controlled by the OS 10 is previously determined as operation to be commonly performed by various application programs.

The application program 11 includes various application programs that may run under control of the OS 10. For example, the application program 11 includes a document generating program such as the Word, a spreadsheet program such as the Excel, a presentation program such as the PowerPoint, and a hypertext mark-up language (HTML) help program 18 that causes the PC 1 to display a help window in a HTML format under control of the OS 10. The application program 11 is previously installed onto the HDD 107. Upon execution of the application program 11, the PC 1 is able to perform various functions using the application program 11 including the function of generating document data, generating spreadsheet data, generating presentation data, and displaying a help window. More specifically, when a user instruction for selecting a specific application program 11 is received through the input device of the user I/F 104, the PC 1 executes the specific application program 11 to perform a function instructed by the user.

The communication controller 13 allows the PC 1 to communicate with the printer 2 through the network 3.

The printer driver 12 controls printing operation to be performed by the printer 2 under control of the OS 10. As described above referring to FIG. 3, the printer driver 12 may be loaded from any desired recording medium such as an optical disc or a USB memory, or from a server or a personal computer through the network 3. Upon installation of the printer driver 12, the OS 10 copies various files of the printer driver 12 onto the respective locations of a memory of the PC 1.

The printer driver 12 includes a user interface (UI) driver 14 and a graphics driver 15. When an instruction for printing data is received through the application program 11, the graphics driver 15 of the printer driver 12 converts the data to be printed to print data having a data format that is interpretable by the printer 2, and sends a printing job request together with the print data to the printer 2 through the communication controller 13. The print data may include any desired type of information such as a character, table, graphical image, etc. When the printing job request is received through the network 3, the printer 2 prints the print data according to the printing job request.

Figure 5:
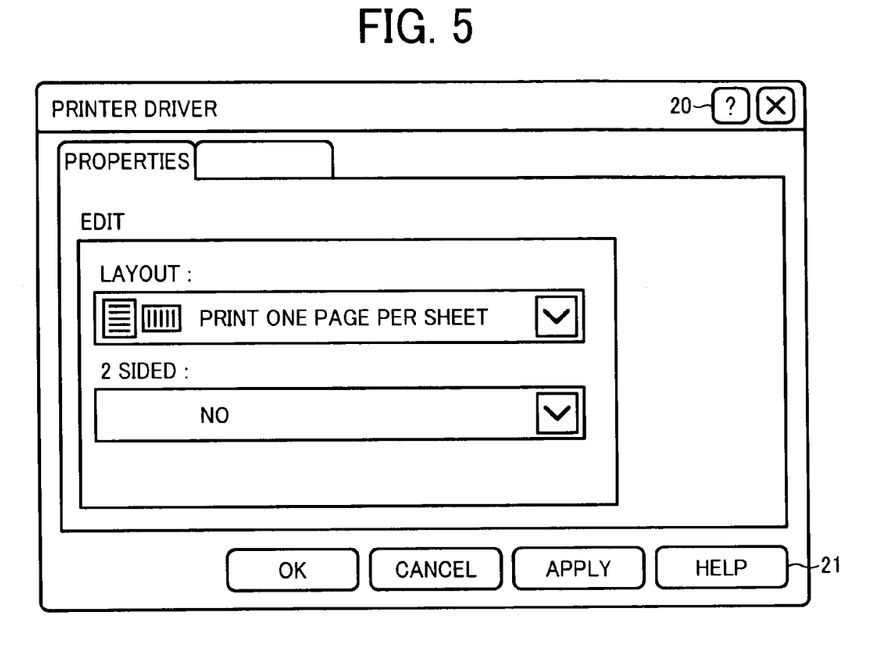
FIG. 5 is an illustration of an example printer driver window displayed by the personal computer of FIG. 2.

In addition to the above-described operation of sending the printing job request, the printer driver 12 performs operation of providing various information regarding the print settings to the user or allowing the user to set the print settings. The UI driver 14 of the printer driver 12 includes a driver display controller 16, which controls operation of displaying a printer driver window. For example, the driver display controller 16 causes the output device of the user interface 104 of the PC 1 to display the printer driver window such as a print setting window for allowing the user to set various printing settings as illustrated in FIG. 5. The UI driver 14 may manage a graphical user interface (GUI) of the printer driver window such as a combo box, edit box, etc.

For example, when the user instructs the PC 1 to print data displayed through the application program 11, the UI driver 14 may display the printer driver window of FIG. 5 to the user through the output device of the user I/F 104. Through the printer driver window of FIG. 5, the user is able to have information regarding the current print settings to be referred by the printer 2 when printing the data. Further, the user is able to modify the current print settings of the printer 2 using the input device of the user I/F 104. In this example illustrated in FIG. 5, the printer driver window allows the user to set the layout option specifying whether to place a plurality of pages into one page, or to set the duplex printing option specifying whether to perform duplex printing.

Further, in this example, the printer driver 12 controls operation of displaying a help window that is generated based on a help file obtained by the HTML help program 18. For example, when the user I/F 104 receives a user instruction for displaying a help window for the printer driver 12, the HTML help program 18 is executed. Under control of the OS 10, the HTML help program 18 obtains a help file specified by the printer driver 12, and causes the PC 1 to display a help window based on the help file obtained by the HTMP help program 18. Referring back to FIG. 5, the printer driver window may be provided with a "?" button 20 and a "HELP" button 21. When any one of the buttons 20 and 21 is selected by the user, a help window regarding the printer 2 is displayed. In this example, the help window provides various information regarding the printing operation performed by the printer 2 or various printing settings applicable to the printer 2.

The help file has been copied onto the PC 1 at the time of installing the printer driver 12. The user usually installs a printer driver, which is specially designed for a specific manufacturer of the printer 2 or a specific machine type of the printer 2.

Figure 6:
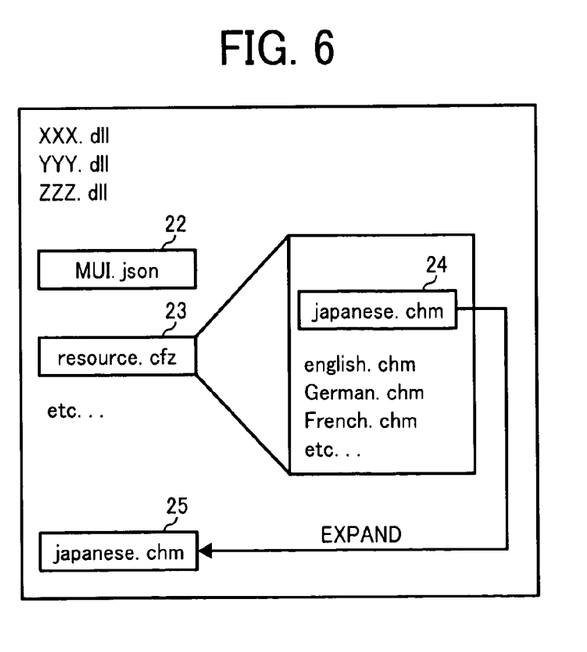
FIG. 6 is an illustration for explaining the files of a printer driver that are copied onto the personal computer of FIG. 2.

As illustrated in FIG. 6, the printer driver 12 includes a printer driver program, and various files such as a table file "MUI.json" 22 and a resource file "resource.cfz" 23. The table file 22 stores information indicating a specific language to be used for a help window, which is determined based on language type information indicating a specific language type currently set for the OS 10. The resource file 23 stores, in a compressed format, a plurality of help files previously prepared for a plurality of languages. Upon installation of the printer driver 12 onto the PC 1, the table file 22 and the resource file 23 are copied onto the PC 1 together with the printer driver program. In this example, the file name of each help file for each language is determined based on each language specified using the table file 22. Alternatively, the file name of each help file may be determined in various other ways.

Referring back to HG 4, the UI driver 14 is additionally provided with a help file manager 17. For example, at the time of installing the printer driver 12 or at the time of displaying a help window, the help file manager 17 inquires the OS 10 to provide language type information specifying a language type that is currently set for the OS 10. Based on the language type information, the help file manager 17 specifies a language to be used for displaying a help window using the table file 22. In this example illustrated in FIG. 6, it is assumed that the specified language that is determined to be used for the help window is Japanese. Once the language is specified, the help file manager 17 expands a help file "japanese.chm" 24 that corresponds to the Japanese language, which is obtainable from the resource file 23. The expanded help file "japanese.chm" 25 is further copied onto the PC 1 at a specific location of the printer driver 12. The help file manager 17 sends information regarding the specified language and the location of the expanded help file to the HTML help program 18. The HTML help program 18 reads the help file from the printer driver 12 using the information regarding the specified language and the location. Based on the obtained help file, the HTML help program 18 generates a help window for display to the user in the specified language under control of the OS 10.

Figure 7:
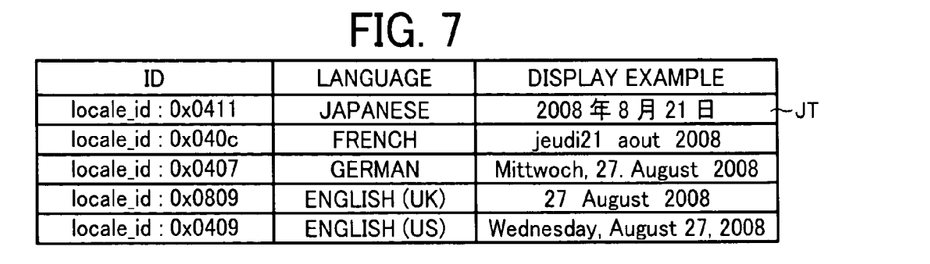
FIG. 7 is a table for explaining setting of the language type information using the regional/language option for an operating system of the personal computer of FIG. 2.

In this example, the language type information indicating the specific language type currently set for the OS 10 is obtained using the regional/language option of the OS 10. Referring to FIG. 7, the OS 10 has the regional/language option, which indicates the language type information and may be set by default or according to the user preference. The language type information set through the regional/language option may be stored within the OS 10. The OS 10 specifies a language to be displayed on a screen of the output device of the user I/F 104 based on the language type information. For example, a number, a currency, a date, or a time may be displayed according to the language type information stored in the OS 10. As illustrated in FIG. 7, a plurality of language types that may be available for use by the OS 10 are each assigned with identification information, which may be referred to as the locale_id. For example, the language type information for the Japanese language is assigned with the locale_id of "0X0411". When the regional/language option of the OS 10 indicates that the Japanese language is set, the time data is displayed in Japanese, for example, as shown in "JT" of FIG. 7.

Further, as illustrated in FIG. 7, the language may include more than one language type, for example, as in the case of the English language that includes at least two types of English such as "English (U.K.)" referring to English that is mainly used in the United Kingdom and "English (U.S.)" referring to English that is mainly used in the United States.

Figure 8:
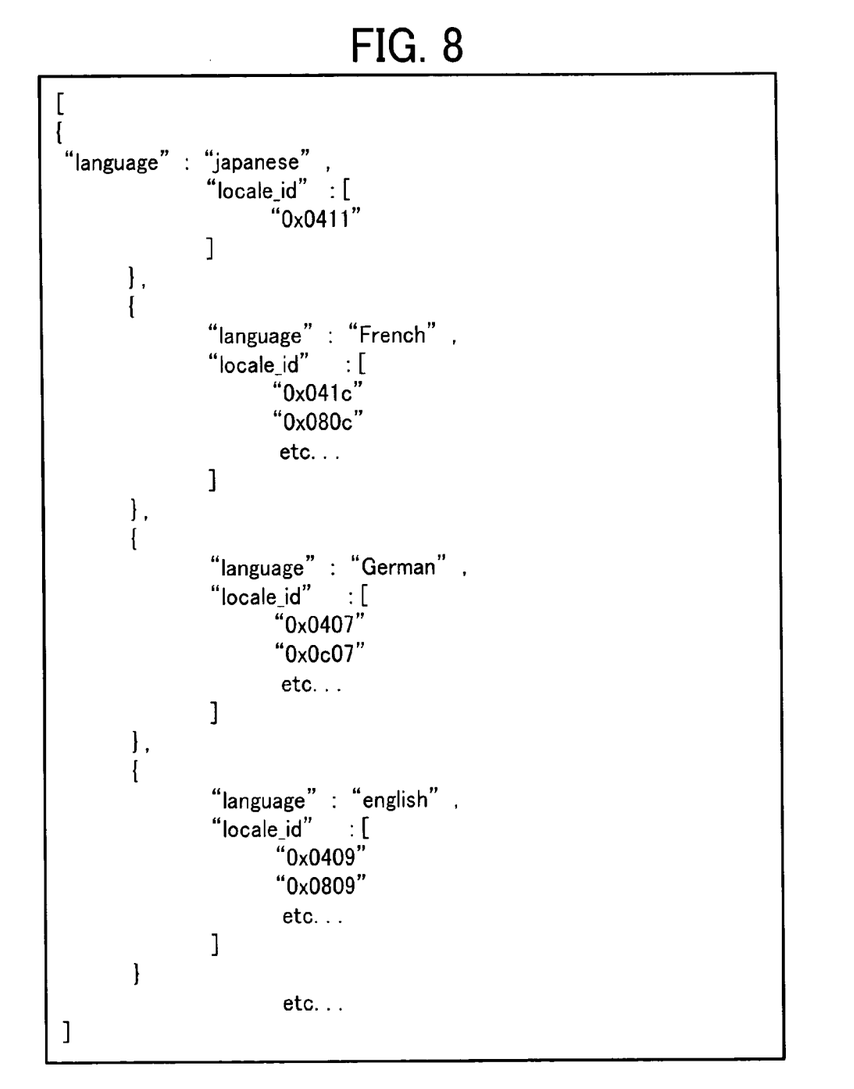
FIG. 8 is an illustration for explaining a table file of the printer driver that is copied onto the personal computer of FIG. 2.

FIG. 8 illustrates an example table file 22 stored in the printer driver 12. The table file 22 stores a plurality of data item sets, each set including the specific language to be used when displaying a help window and the identification information "locale_id" of the regional/language option of the OS 10 that corresponds to the specific language. Once the language type information such as the identification. information "locale_id" of the regional/language option is obtained, the help file manager 17 refers to the table file 22 to search for the language that corresponds to the obtained "locale_id". The language that corresponds to the obtained "locale_id" is determined as the language to be used for the help window.

In operation, when the button 20 or 21 of FIG. 5 is selected by the user, the help file manager 17 inquires the OS 10 to obtain the language type information that has been set through the regional/language option of the OS 10. More specifically, the help file manager 17 obtains the identification information "locale_id" that has been assigned to the language type currently set for the OS through the regional/language option, and specifies the language that corresponds to the obtained identification information "locale_id" using the table file 22 of FIG. 8. The help file manager 17 further obtains a help file that corresponds to the specified language from the resource file 23 to expand the obtained help file. The help file manager 17 copies the expanded help file onto the PC 1 at a specific location of the printer driver 12, and notifies the HTML help program 18 of the language type information or information indicating the location at which the help file is stored.

Figure 12:
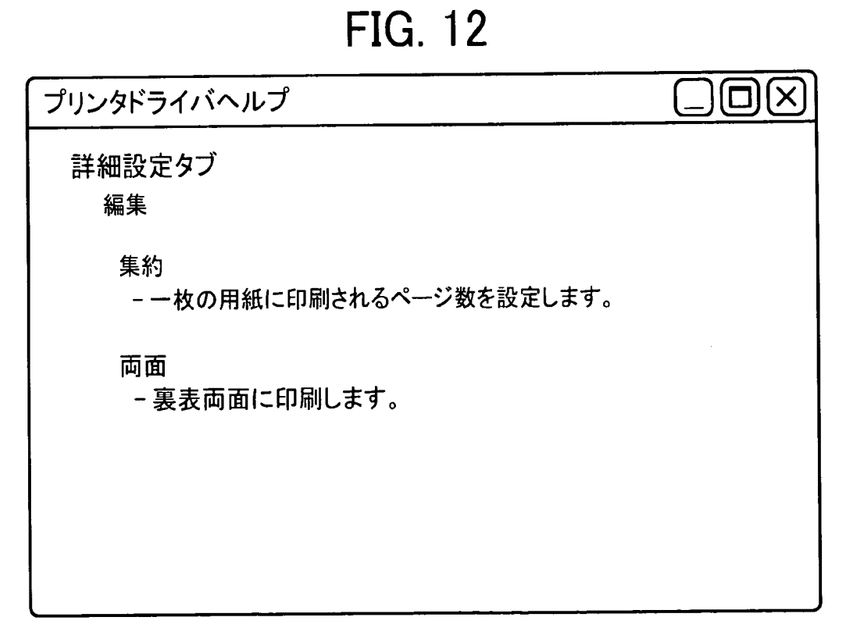
FIG. 12 is an illustration of an example printer driver help window displayed by the personal computer of FIG. 2 when the language for the OS is set to Japanese.

In one example, it is assumed that the help file manager 17 obtains the "locale_id" of "0X0411", which has been set through the regional/language option of the OS 10, as the language type information. In such case, the help file manager 17 refers to the table file 22 of FIG. 8 to obtain the language "japanese" that corresponds to the "local_id" of "0X0411" to specify that the Japanese language should be used. The help file manager 17 obtains the Japanese help file "japanese.chm" 24 (FIG. 6), which is compressed, from the resource file 23 to generate the expanded Japanese help file "japanese.chm" 25. The help file manger 17 copies the expanded Japanese help file "japanese.chm" 25 onto the PC 1 at a specific location of the printer driver 12, and notifies the HTML help program 18 of the language type information or information regarding the location of the expanded Japanese help file. The HTML help program 18 reads the expanded Japanese help file "japanese.chm" 25 using the language type information or information regarding the location of the expanded Japanese help file. The HTML help program 18 generates a help window for display to the user in the Japanese language based on the expanded Japanese help file. The PC 1 displays the help window having information written in Japanese as illustrated in FIG. 12.

Figure 11:
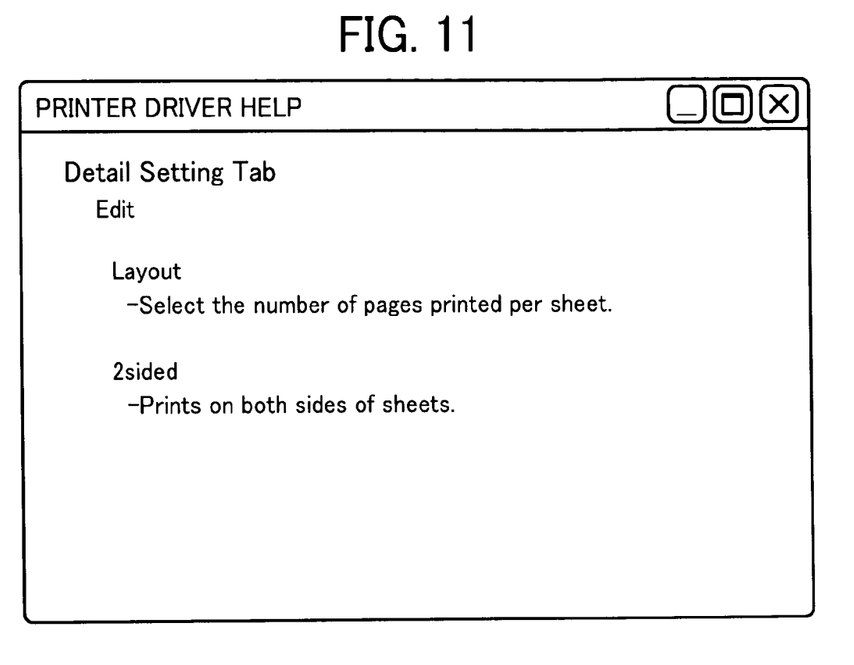
FIG. 11 is an illustration of an example printer driver help window displayed by the personal computer of FIG. 2 when the language for the OS is set to English.

Further, in this example illustrated in FIG. 6, the compressed English help file "english.chm" may be expanded when the language type information indicates that the English (U.K.) or the English (U.S.) is the language type set for the OS 10. For example, when the help file manager 17 obtains the "locale_id" of "0X0809" as the language type information, the help file manager 17 refers to the table file 22 of FIG. 8 to obtain the language that corresponds to the "locale_id" of "0X0809" and specify that the English language should be used. In a substantially similar manner, when the help file manager 17 obtains the "locale_id" of "0X0409" as the language type information, the help file manager 17 refers to the table file 22 of FIG. 8 to obtain the language that corresponds to the "locale_id" of "0X0409" and specify that the English language should be used. In this manner, in either case, the English help file "english.chm" is obtained and copied onto the PC 1. In this manner, the PC 1 displays a help window having information written in English as illustrated in FIG. 11.

In the above-described example, if the help file manager 17 finds that the help file that corresponds to the specified language has been already copied onto the PC 1 at a specific location of the printer driver 12, it is not necessary to expand the help file again or copy the expanded help file again.

Further, it is assumed that the help file manager 17 finds that the help file that corresponds to the specified language differs from the help file that has been previously expanded and stored in the printer driver 12. For example, the PC 1 receives a user instruction for displaying a help window for the printer driver 12 after the expanded Japanese help file "japanese.chm" is copied onto the PC 1 at a specific location of the printer driver 12. The help file manager 17 obtains the "local_id" of "0X0407" as the language type information from the OS 10, and specifies that the German language should be used using the table file 22. In such case, the help file manager 17 expands the German help file "german.chm" from the resource file 23 to obtain the expanded German help file "german.chm". In such case, the help file manager 17 may overwrite the expanded Japanese help file "japanese.chm" with the expanded German help file "german.chm". Alternatively, the help file manager 17 may store the expanded German help file "german.chm" at the location that is different from the location at which the expanded Japanese help file "japanese.chm" is stored, and delete the Japanese help file "japanese.chm". When the location of the expanded help file changes, the help file manager 17 notifies the HTML help program 18 of information regarding the location at which the expanded help file is stored. This prevents the problem of having more than one help file at a time such that the printer driver 12 is made in compliance with a rule set for the OS.

Figure 9:
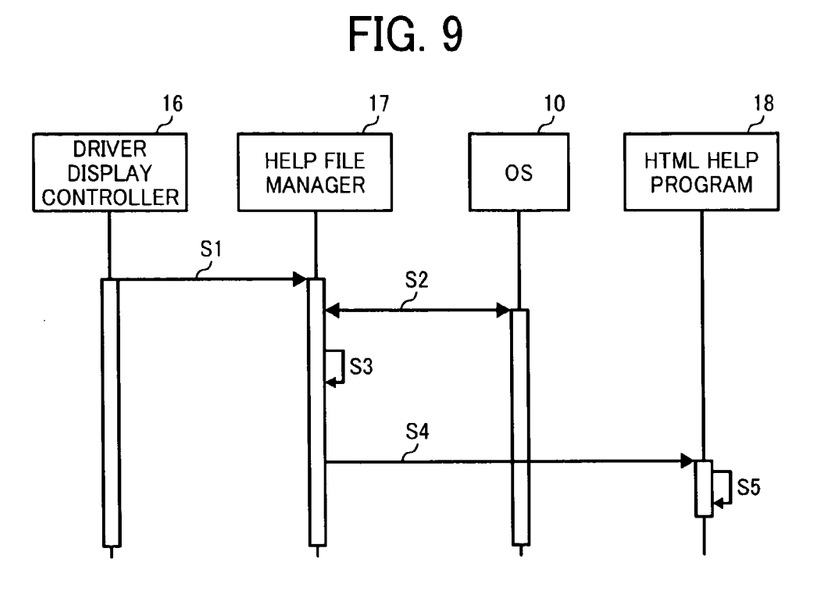
FIG. 9 is a data flow diagram illustrating operation of displaying a help window, performed by the personal computer of FIG. 2.

FIG. 9 is a data flow diagram illustrating operation of displaying a help window, performed by the PC 1, according to an example embodiment of the present invention. The operation of FIG. 9 may be performed when the PC 1 receives a user instruction for displaying a help window for the printer driver 12, for example, when the user selects the button 20 or 21 of FIG. 5.

At S1, the driver display controller 16 of the PC 1 sends the help file manager 17 with an instruction for obtaining language type information indicating the language type currently set for the OS 10.

At S2, the help file manager 17 inquires the OS 10 for the language type information. More specifically, the help file manager 17 obtains the identification information "locale_id" of the OS 10 that is currently set through the regional/language option of the OS 10.

At S3, the help file manager 17 refers to the table file 22 of FIG. 8, which is provided in the printer driver 12 installed onto the PC 1, to specify the language that corresponds to the obtained "locale_id". Once the language is specified, the help file manager 17 obtains a compressed help file from the resource file 23, which is provided in the printer driver 12 installed onto the PC 1, that corresponds to the specified language. The help file manager 17 further expands the obtained compressed help file for the specified language, and copies the expanded help file for the specified language onto the PC 1 at a specific location of the printer driver 12.

Alternatively, if the help file manager 17 determines that the help file that corresponds to the specified language has been already copied onto the PC 1 in the expanded format, S3 is not performed.

At S4, the help file manager 17 notifies the HTML help program 18 of information regarding the location of the stored expanded help file. Additionally or alternatively, the help file manager 17 may notify the HTML help program 18 of the language type information. For example, if the specified language is Japanese and the help file for the Japanese language has been copied, the help file manager 17 may send the "locale_id" of "0X0411" to the HTML help program 18.

At S5, the HTML help program 18 reads the expanded help file for the specified language using the location information or the language type information obtained from the help file manager 17. Based on the obtained help file, a help window is displayed in the specified language, and the operation ends.

Figure 10:
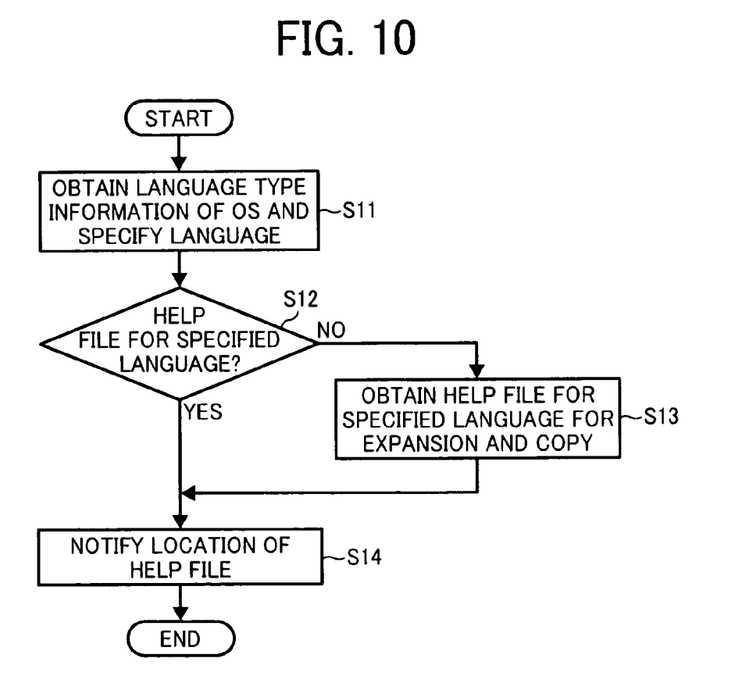
FIG. 10 is a flow chart illustrating operation of displaying a help window, performed by the personal computer of FIG. 2.

FIG. 10 is a flowchart illustrating operation of displaying a help window, performed by the PC 1, according to an example embodiment of the present invention. The operation of FIG. 10 may be performed by the help file manager 17 when the PC 1 receives a user instruction for displaying a help window for the printer driver 12, for example, when the user selects the button 20 or 21 of FIG. 5.

At S11, the help file manager 17 inquires the OS 10 to obtain language type information indicating the language type currently set for the OS 10 and specify the language to be used for the help window. More specifically, the help file manager 17 obtains the identification information "locale_id" of the OS 10 that is currently set through the regional/language option of the OS 10, and specifies the language to be used for the help window using the table file 22.

At S12, the help file manager 17 determines whether the help file for the specified language has been copied within the printer driver 12 in the expanded format. When it is determined that the help file for the specified language has been copied ("YES" at S12), the operation proceeds to S14. When it is determined that the help file for the specified language has not been copied ("NO" at S12), the operation proceeds to S13.

At S13, the help file manager 17 obtains the compressed help file that corresponds to the specified language from the resource file 23, and copies the expanded help file for the specified language within the printer driver 12 installed on the PC 1.

At S14, the help file manager 17 notifies the HTML help program 18 of the location information indicating the location of the stored expanded help file. Additionally or alternatively, at S14, the help file manager 17 may notify the HTML help program 18 of the language type information of the specified language, and the operation ends.

As described above referring to FIG. 9 or 10, since the HTML help program 18 obtains a help file prepared for a language specified according to the language currently set for the OS 10, the PC 1 is able to display a help window in the language understandable to the user.

For example, it is assumed that the user at the PC 1 selects the button 20 or 21 of FIG. 5 when the language type information of the OS 10 is set to any type of the English language. In such case, the PC 1 displays a help window of FIG. 11, which displays information in English.

In another example, it is assumed that the user at the PC 1 selects the button 20 or 21 of FIG. 5 when the language type information of the OS 10 is set to the Japanese language. In such case, the PC 1 displays a help window of FIG. 12, which displays information in Japanese.

The PC 1 is able to automatically switch the language to be used for the help window based on the language type information currently set for the OS such that the user does not have to perform any operation even when the language has been changed.

Further, at the time of installing the printer driver 12 or at the time of requesting for the display of a help window, the user does not have to manually select a specific language to be used, thus improving the operability.

Further, in this example, a developer of the printer driver 12 is able to provide the help window 12 capable of displaying a help window in various languages with a simple structure. As described above referring to FIG. 6, a plurality of help files previously prepared respectively for a plurality of languages is stored in a compressed format as one resource file.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

In the above-described example, the language to be used for the help window is specified using the table file 22. Alternatively, the help files prepared for the respective languages, which are located in the resource file 23, may be provided in a manner that a help file can be searched according to the language type information of the OS 10. In such case, the help file manager 17 obtains the language type information from the OS 10, such as the locale_id. Based on the obtained language type information, the help file manger 17 searches the resource file 23 for a help file that corresponds to the obtained language type information without referring to the table file 22. In this manner, the table file 22 does not have to be provided.

In another example, any one of the above-described functions or methods of controlling a language to be displayed by the OS may be implemented in various other ways. For example, the printer 2 of FIG. 2 may be any desired image forming apparatus such as a facsimile, scanner, copier, or multifunctional apparatus capable of providing a plurality of image forming functions. Further, the PC 1 of FIG. 2 may be any desired information processing apparatus capable of displaying information to the user such as a personal digital assistant (PDA), portable phone, digital camera, etc.

For example, referring to FIG. 2, if the printer 2 is replaced by a scanner, the PC 1 is installed with a scanner driver that controls operation of the scanner. In such case, the help file manager 17 may be provided in the scanner driver to cause the OS 10 of the PC 1 to display a help window for the scanner driver in a language determined according to the language type information of the OS 10. In other words, any one of the above-described functions or methods of controlling a language to be used for a help window is not limited to the case of printer driver.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in: an information processing apparatus including: means for storing a resource file in which a plurality of help files respectively prepared for a plurality of languages is stored in a compressed format, wherein the help file is referred by a help display program of an operating system; means for specifying a language to be used for display; means for expanding a help file that corresponds to the specified language obtained from the resource file and storing an expanded help file at a location accessible by the help display program; and means for notifying the help display program of information allowing the help display program to access the expanded help file.

In the above-described example, the means for specifying stores a table file. The table file stores a plurality of items of language type information indicating a language type that is set for the operating system and a plurality of languages respectively corresponding to the plurality of items of language type information. The means for specifying obtains language type information currently set for the operating system, and refers to the table file to obtain a language that corresponds to the obtained language type information as the language to be used for display.

What is claimed is:

1. An information processing apparatus, comprising:
    a storage device configured to store a resource file including a plurality of help files previously prepared respectively for a plurality of languages in a compressed format;
    an operating system configured to control the information processing apparatus;
    a help display processor configured to read one of the plurality of help files that is previously registered for the operating system and to generate a help window based on the read help file;
    a printer driver configured to control print processing, the print driver including a help manager; and
    a user interface configured to display the help window generated by the help display processor,
    wherein the help manager of the printer driver is configured to:
        obtain language type information indicating a language type currently set for the operating system from the operating system;
        obtain one of the plurality of help files that corresponds to the obtained language type information from the resource file, the obtained help file being different from the previously registered help file;
        expand the obtained help file into an expanded help file to store the expanded help file at a specific location of the storage device; and
        send a notification to the help display processor, the notification indicating a specific location that the expanded help file is stored, and
    wherein the help display processor is further configured to read the expanded help file that corresponds to the obtained language type information from the storage device using the notification indicating the specific location that the expanded help file is stored and to generate a help window based on the expanded help file in the currently set language type for display through the user interface.

2. The apparatus of claim 1, wherein the storage device further stores a table file including a plurality of languages respectively corresponding to a plurality of items of the language type information, and
    the help file manager is configured to specify one of the plurality of languages that is stored in the table file with respect to the obtained language type information as a language to be used for displaying the help window, and obtain one of the plurality of help files that corresponds to the specified language from the resource file for expansion as the help file that corresponds to the obtained language type information.

3. The apparatus of claim 1, wherein when the user interface receives a user instruction for displaying a help window, the help file manager is configured to determine whether the help file that corresponds to the obtained language type information has been expanded to generate a determination result and obtain one of the plurality of help files that corresponds to the obtained language type information from the resource file for expansion according to the determination result indicating that the help file that corresponds to the obtained language type information has not been expanded.

4. The apparatus of claim 3, wherein the language type information is obtained using a regional/language option of the operation system.

5. The information processing apparatus of claim 1, wherein, when there is one or more expanded help files other than the expanded help file corresponding to the obtained language type information, the help file manger deletes the one or more expanded help files other than the expanded help file corresponding to the obtained language type information.

6. The apparatus of claim 1, wherein the help file manager is further configured to notify the help display processor of location information indicating the specific location at which the expanded help file is stored and the language type information to cause the help display processor to obtain the expanded help file using the at least one of the location information and the language type information.

7. A method of controlling a display of an information processing apparatus, the information processing apparatus comprising an operating system, a help display processor to read one of a plurality of help files that is previously registered for the operating system and to generate a help window based on the read help file, and a printer driver including a help manager, the method comprising:
    storing a resource file at a storage device, the resource file including a plurality of help files previously prepared respectively for a plurality of languages in a compressed format;
    obtaining language type information indicating a language type currently set for the operating system from the operating system;
    obtaining one of the plurality of help files that corresponds to the obtained language type information from the resource file, the obtained help file being different that the previously registered help file;
    expanding the obtained help file into an expanded help file to store the expanded help file at a specific location of the storage device;
    sending a notification from the help manager of the printer driver to the help display processor, the notification indicating the specific location at which the expanded help file is stored;
    reading, at the help display processor, the expanded help file that corresponds to the obtained language type information from the storage device using the notification indicating the specific location at which the expanded help file is stored;
    generating at the help display processor, a help window based on the expanded help file in the currently set language type; and
    displaying the help window generated based on the expanded help file.

8. The method of claim 7, further comprising:
storing a table file at the information processing apparatus, the table file including a plurality of languages respectively corresponding to a plurality of items of the language type information;
specifying one of the plurality of languages that is stored in the table file with respect to the obtained language type information as a language to be used for displaying the help window; and
obtaining one of the plurality of help files that corresponds to the specified language from the resource file for expansion as the help file that corresponds to the obtained language type information.

9. The method of claim 7, wherein, when there is one or more expanded help files other than the expanded help file corresponding to the obtained language type information, the method further comprising:
deleting the one or more expanded help files other than the expanded help file corresponding to the obtained language type information.

10. The method of claim 7, further comprising,
notifying by the file manager, the help display processor of location information indicating the specific location at which the expanded help file is stored and the language type information to cause the help display processor to obtain the expanded help file using the at least one of the location information and the language type information.

11. A non-transitory recording medium storing a plurality of instructions which cause a computer to perform a method of controlling a display of an information processing apparatus, the information processing apparatus comprising an operating system, a help display processor to read one of a plurality of help files that is previously registered for the operating system and to generate a help window based on the read help file, and a printer driver including a help manager, the method comprising:
storing a resource file at a storage device, the resource file including a plurality of help files previously prepared respectively for a plurality of languages in a compressed format;
obtaining language type information indicating a language type currently set for the operating system from the operating system;
obtaining one of the plurality of help files that corresponds to the obtained language type information from the resource file, the obtained help file being different that the previously registered help file;
expanding the obtained help file into an expanded help file to store the expanded help file at a specific location of the storage device;
sending notification from the help manager of the printer driver to the help display processor, the notification indicating the specific location at which the expanded help file is stored;
reading, at the help display processor, the expanded help file that corresponds to the obtained language type information from the storage device using the notification indicating the specific location at which the expanded help file is stored;
generating at the help display processor, a help window based on the expanded help file in the currently set language type; and
displaying the help window generated based on the expanded help file.

12. The recording medium of claim 11, wherein the method further comprises:
storing a table file at the information processing apparatus, the table file including a plurality of languages respectively corresponding to a plurality of items of the language type information;
specifying one of the plurality of languages that is stored in the table file with respect to the obtained language type information as a language to be used for displaying the help window; and
obtaining one of the plurality of help files that corresponds to the specified language from the resource file for expansion as the help file that corresponds to the obtained language type information.

13. The non-transitory recording medium of claim 11, when there is one or more expanded help files other than the expanded help file corresponding to the obtained language type information, the method further comprising:
deleting the one or more expanded help files other than the expanded help file corresponding to the obtained language type information.

14. The non-transitory recording medium of claim 11, wherein the method further comprises:
notifying, by the file manager, the help display processor of location information indicating the specific location at which the expanded help file is stored and the language type information to cause the help display processor to obtain the expanded help file using the at least one of the location information and the language type information.

* * * * *